United States Patent
Karidis et al.

(10) Patent No.: US 6,229,693 B1
(45) Date of Patent: May 8, 2001

(54) ARTICULATED DISPLAY FOR NOTEBOOK COMPUTER

(75) Inventors: John P. Karidis, Ossining, NY (US); David Wayne Hill, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,117

(22) Filed: Mar. 31, 1999

(51) Int. Cl.$^7$ .................................................. G06F 1/16
(52) U.S. Cl. .............................. 361/681; 362/23; 362/31; 362/559
(58) Field of Search ........................ 361/610, 680–683, 361/707, 725; 362/23, 31, 551, 561, 560, 559, 341

(56) References Cited

U.S. PATENT DOCUMENTS

| | | | |
|---|---|---|---|
| 4,832,419 | * 5/1989 | Mitchell et al. | 361/681 |
| 4,960,256 | * 10/1990 | Chihara et al. | 361/681 |
| 5,083,290 | * 1/1992 | Hosoi | 361/681 |
| 5,107,402 | * 4/1992 | Malgouires | 361/681 |
| 5,229,757 | * 7/1993 | Takamiya et al. | 361/681 |
| 5,247,285 | * 9/1993 | Yokota et al. | 345/169 |
| 5,337,212 | * 8/1994 | Bartlett et al. | 361/681 |
| 5,347,630 | * 9/1994 | Ishizawa et al. | 361/681 |
| 5,684,513 | * 11/1997 | Decker | 345/168 |
| 5,708,561 | * 1/1998 | Huilgol et al. | 361/681 |
| 5,777,704 | * 7/1998 | Selker | 349/58 |
| 5,815,225 | * 9/1998 | Nelson | 362/26 |
| 5,991,150 | * 11/1999 | Chiu et al. | 361/681 |
| 6,064,373 | * 5/2000 | Ditzik | 361/681 |
| 6,081,420 | * 6/2000 | Kim et al. | 361/681 |
| 6,094,341 | * 7/2000 | Lin | 361/681 |

FOREIGN PATENT DOCUMENTS

| | | | |
|---|---|---|---|
| 3935042 C1 | * 10/1989 | (DE) | 361/681 |
| 0446414A2 | * 9/1991 | (EP) | 361/381 |
| 0510814A1 | * 10/1992 | (EP) | 361/681 |

* cited by examiner

*Primary Examiner*—Leo P. Picard
*Assistant Examiner*—Lisa Lea-Edmonds
(74) *Attorney, Agent, or Firm*—J Bruce Schelkopf; Felsman, Bradley, Vaden, Gunter & Dillon, LLP

(57) ABSTRACT

A notebook computer has a base, a lid and a display monitor located within the lid. The lid also contains a device which may be used to articulate and support the display in various positions away from the lid that improve viewing for the user under limited or cramped conditions. The device uses a linkage member to pivotally move the display out of the lid, closer to the user, and higher above the base. The linkage locks into place in a conventional lower position and an elevated upper position. After the linkage is locked in the upper position, the display may be tilted to a desired angle. Although the device allows the display angle to be increased well beyond vertical, the display does not obscure the user's view of the keyboard while in this position. In low light conditions, the device also incorporates a light source behind the display for illuminating the keyboard beneath the display.

19 Claims, 4 Drawing Sheets

ARTICULATED DISPLAY FOR NOTEBOOK COMPUTER

BACKGROUND OF THE INVENTION

1. Technical Field

This invention relates in general to notebook computers and in particular to a display monitor for a notebook computer which may be articulated to improve the ergonomics and usability of the computer.

2. Background Art

In general, modern notebook computers are being designed with larger display monitors than ever before. As a result, the overall size of notebook computers is increasing as well. Although larger notebook computers are as portable as their smaller predecessors, there are some cramped situations that make it difficult or impossible to comfortably use them.

In FIG. 1, for example, a standard airline tray table 11 in coach class seating has very limited space for operating a larger notebook computer 13. In this situation, the display 15 can be opened only about 100 degrees (approximately 10 degrees beyond vertical) relative to the base 17 or keyboard of the computer. This is true even if computer 13 is located as close to the user (not shown) as possible and the passenger in front of the user keeps their seat back 19 in the fully upright and locked position. The problem is enhanced if the passenger seated in front of the user chooses to recline their seat back 19 (FIG. 2). In this situation, the display 15 can be opened only about 80 degrees or less. Since the line of sight 12 between the user's eyes and the middle of display 15 is typically 45 to 50 degrees below the horizon 14, the user will view display 15 at approximately 55 to 60 degrees off axis 16 (normal to the screen). In this range of view angles, display 15 is unreadable and unusable.

Display viewing problems such as these are present in virtually all notebook computers having a 12.1 inch or larger diagonal display. It is more severe for the more recent and/or planned notebook computers having displays measuring in excess or 14 or 15 inches. With these large, standard aspect ratio displays, it is very difficult to use the computer under limited or cramped conditions. A notebook computer with improved display positioning relative to the user is needed.

SUMMARY OF THE INVENTION

A notebook computer has a base, a lid and a display monitor located within the lid. The lid also contains a device which may be used to articulate and support the display in various positions away from the lid that improve viewing for the user under limited or cramped conditions. The device uses a linkage member to pivotally move the display out of the lid, closer to the user, and higher above the base. The linkage locks into place in a conventional lower position and an elevated upper position. After the linkage is locked in the upper position, the display may be tilted to a desired angle. Although the device allows the display angle to be increased well beyond vertical, the display does not obscure the user's view of the keyboard while in this position. In low light conditions, the device also incorporates a light source behind the display for illuminating the keyboard beneath the display.

BEST MODE FOR CARRYING OUT THE INVENTION

Figure 1:
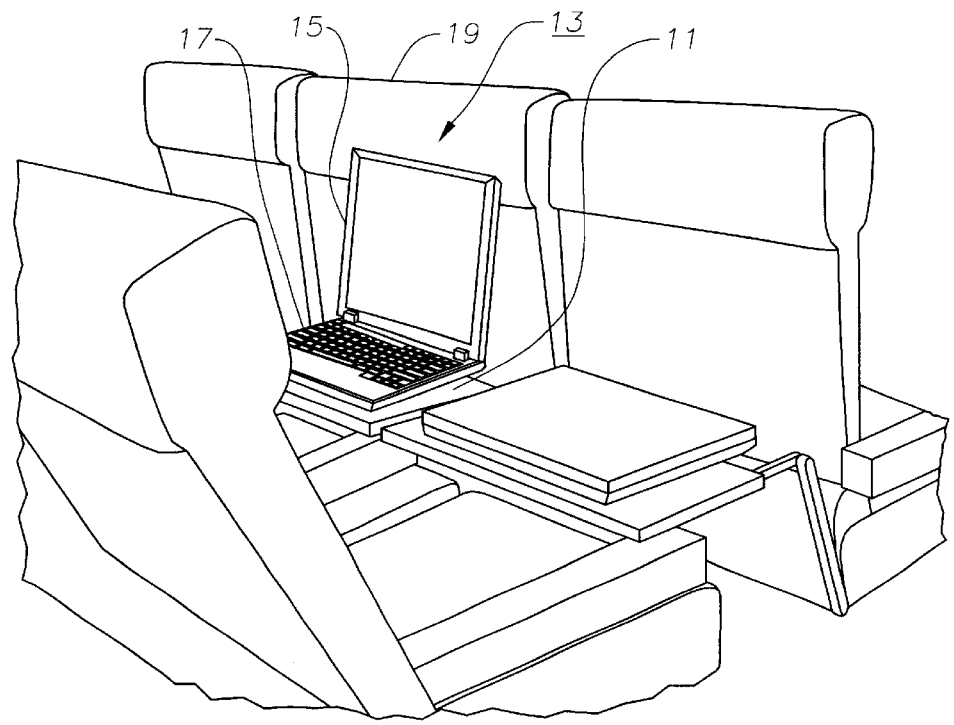
FIG. 1 is a schematic drawing of a prior art notebook computer on an airline tray table with the seat in an upright position.
Figure 2:
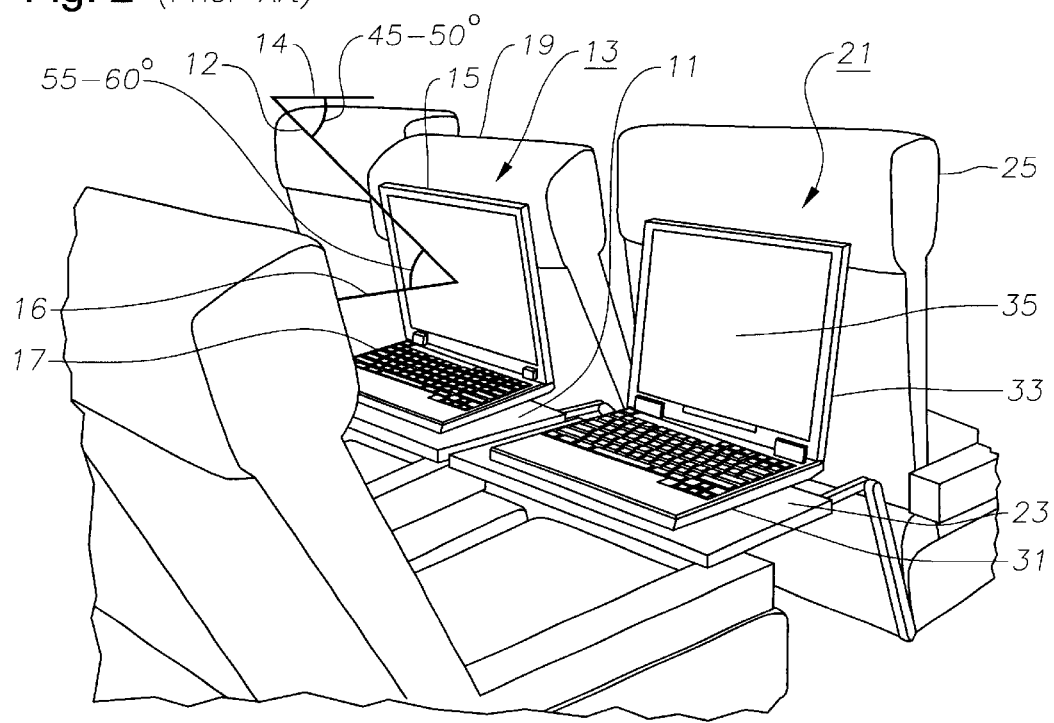
FIG. 2 is a schematic drawing of the computer of FIG. 1 with the seat in a reclined position.

Referring to FIG. 2, an improved notebook computer 21 is shown on an airline seat back tray table 23. Tray table 23 is pivotally mounted to a seat back 25 and is in its fully extended or open position. Seat back 25 is in its upright, fully locked position. For comparison, a conventional notebook computer 13 is shown on tray table 11 to the left of computer 21. Tray table 11 is mounted to seat back 19 which is in a reclined position.

Computer 21 has a base 31 and a cover or lid 33. Base 31 comprises a keyboard, a disc drive and various other electrical components for carrying out computing functions. The lower edge of lid 33 is pivotally mounted to the rearward edge of base 31 so that lid 33 may be positioned at various angular displacements in the range of zero to 180 degrees relative to the user. Lid 33 is limited to about 90 degrees relative to base 31 because of the position of seat back 25.

Lid 33 has a large recess (not shown) on its front surface which contains and supports a monitor or display 35 which is viewed by the user. In the embodiment shown, lid 33 and display 35 are both rectangular and display 35 is only slightly smaller than lid 33. Display 35 may be viewed in a conventional manner as is done with prior art displays by rotating lid 33 to a preferred angular displacement. In this retracted position, display 35 is substantially flush with lid 33. However, in situations like the one shown in FIG. 2, display 35 cannot be placed in an ergonomically correct position for proper viewing by the user because of seat back 25. The images depicted on display 35 will appear dark and/or distorted to the user when it is at a poor viewing angle. Moreover, if seat back 25 is reclined like seat back 19, the user's view of display 35 will be even worse.

Figure 3:
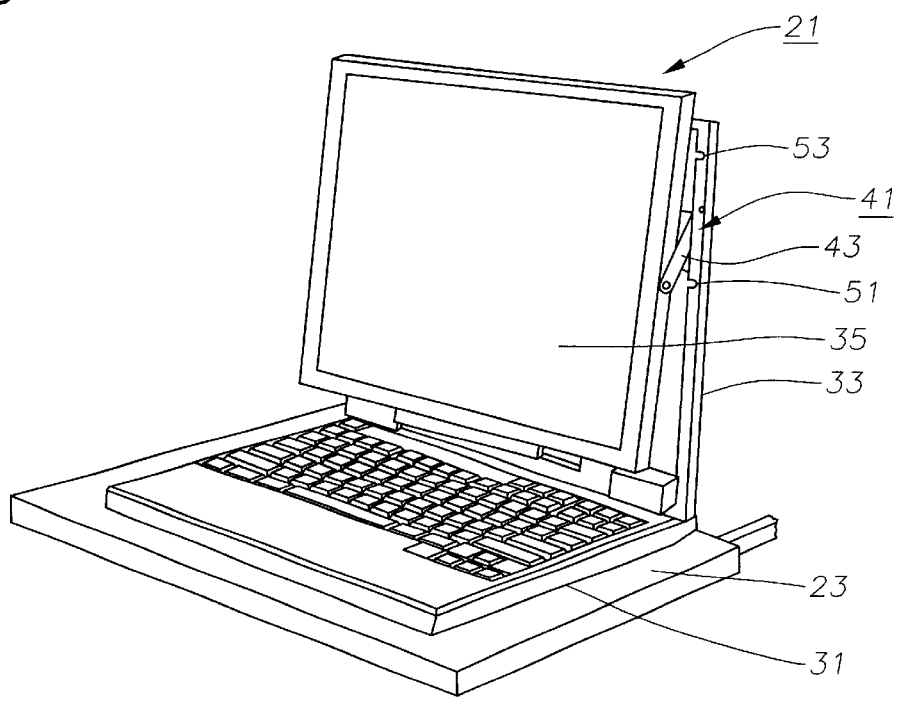
FIG. 3 is a schematic drawing of a notebook computer that is constructed in accordance with the invention, shown on an airline tray table and with a display at an initial stage of deployment.
Figure 4:
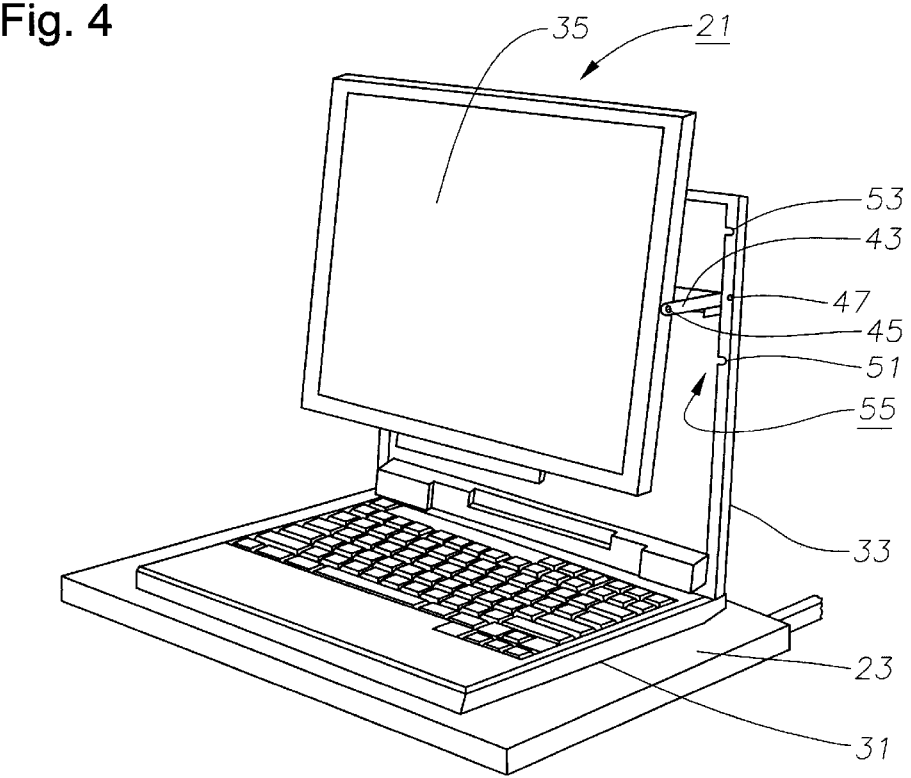
FIG. 4 is a schematic drawing of the computer of FIG. 3 shown with its display at a second stage of deployment.

Computer 21 was created to solve viewing problems such as these. Referring now to FIG. 3, a means or device 41 for articulating and positioning display 35 away from lid 33 is shown. Device 41 preferably comprises a single piece of sheet metal or other material which is bent to form one support link or arm 43 on each side of display 35 (only the right side is shown), but could also comprise two independent arms. Arms 43 pivotally link display 35 to lid 33. Each arm 43 has two pivot points 45, 47 (FIG. 4) and is mounted to and extends between adjacent side edges of display 35 and lid 33. Pivot points 45, 47 are defined where arm 43 attaches to display 35 and lid 33, respectively. Pivot points 45 are substantially vertically aligned with the center of gravity of display 35. Pivot points 47 attach to lid 33 at a position which is elevated above pivot points 45 (when computer 21 is open at about 90 degrees).

Arms 43 of device 41 are designed to latch into lid 33 at two different latching positions which are illustrated by notches or detents 51, 53 in lid 33. Detents 53 are located above detents 51 near the upper edge of lid 33. Each detent 51, 53 contains a spring clip 55 which engages a latching feature on arm 43, such as a hole or other feature built into each arm 43. Detents 51 are provided for retaining display 35 in the standard or conventional position (FIG. 2). Detents 53 are provided for retaining display 35 in a position such that its center of gravity is much closer to the top edge of lid 33, as will be shown and described more clearly below. Spring clips 55 are provided for securing display 35 in a selected one of the two positions. Device 41 also has a release latch (not shown) for disengaging arms 43 from spring clips 55.

Figure 5:
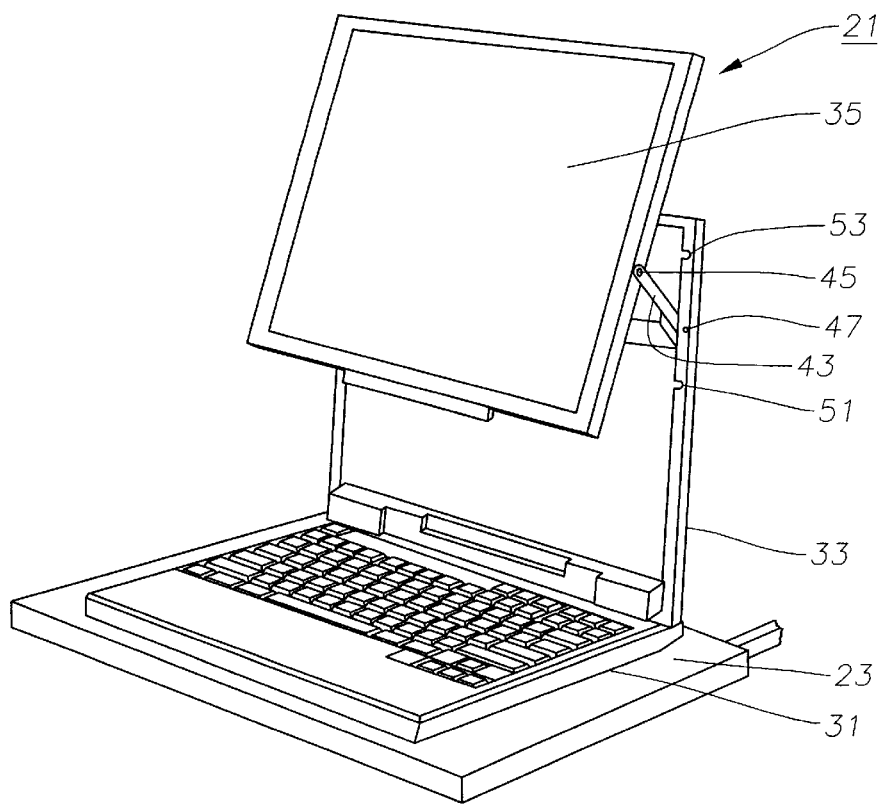
FIG. 5 is a schematic drawing of the computer of FIG. 3 shown with its display at a third stage of deployment.
Figure 6:
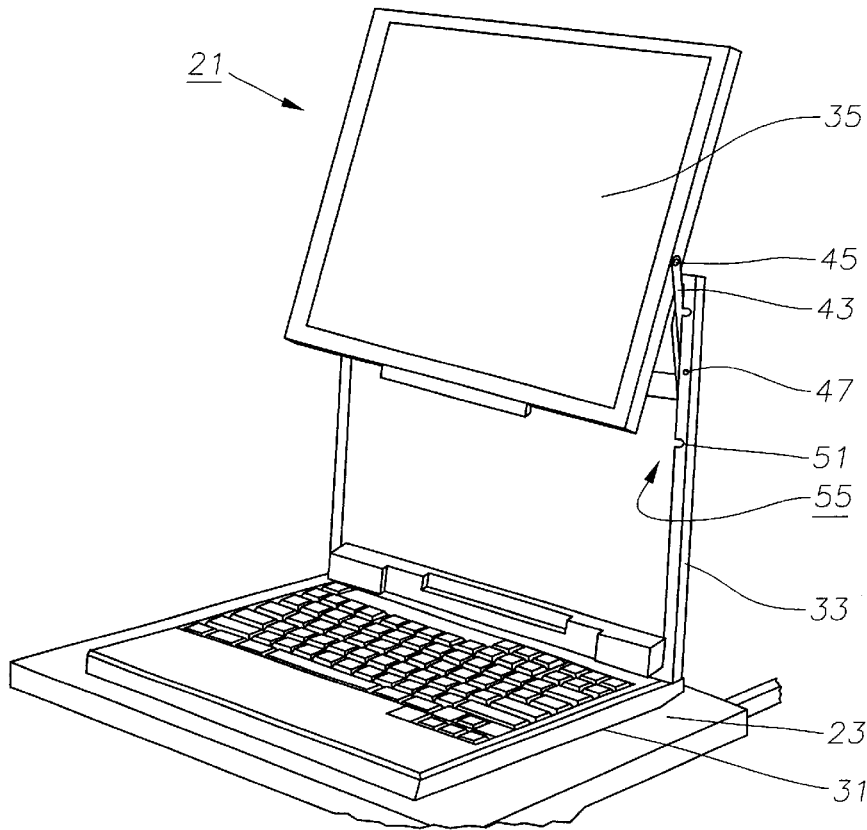
FIG. 6 is a schematic drawing of the computer of FIG. 3 shown with its display at a fourth stage of deployment.

To move or deploy display 35 from its conventional retracted position (FIG. 2) to an extended position for improved viewing, the release latch (not shown) is depressed so that spring clips 55 in detents 51 disengage the features on arms 43. Display 35 is pulled forward out of lid 35 (FIG. 3), and then upward in an arcuate motion about pivot points 47 (FIG. 4) until pivot points 45 are located above pivot points 47 (FIG. 5). At this point, arms 43 have been rotated about 135 degrees while display 35 remains substantially vertical. With continued rotation, pivot points 45 will move toward detents 53 until the features on arms 43 engage the spring clips 55 located inside detents 53 (FIG. 6) to retain display 35 in the elevated position. At this stage, arms 43 and lid 35 are no longer free to move relative to one another, although display 35 is still free to rotate about pivot points 45. In the extended position, the center of gravity of display 35 is located above and in front of lid 33.

Figure 7:
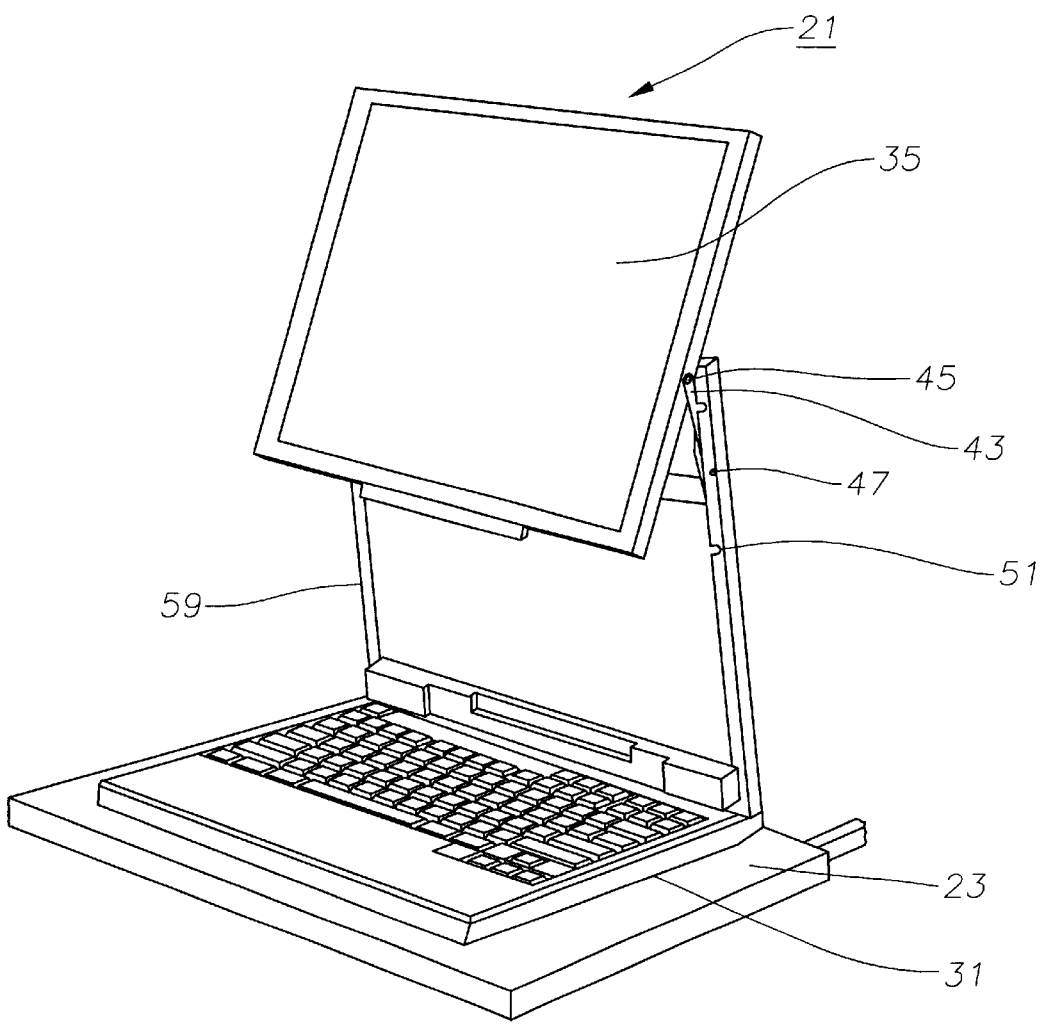
FIG. 7 is a schematic drawing of the computer of FIG. 3 shown with its display at a final stage of deployment.

Display 35 may be further articulated for better viewing and to create more clearance between it and seat back 25. As shown in FIG. 7, lid 33 may be rotated forward a selected distance to decrease the angle between it and base 31 to about 80 degrees. The viewing angle of display 35 is adjusted by tilting or rotating the top edge of display 35 away from the user. Note that orientation of display 35 may be maintained even if the passenger in front of the user chooses to recline seat back 25 toward the user.

To support the weight of display 35 in a wide range of positions, the amount of friction and/or spring counterforce which is provided by the hinge between base 31 and lid 33 must be carefully selected. In FIG. 7, display 35 has been elevated by approximately one-half of its height. Although the lower edge of display 35 is shifted forward, the user's view of the keyboard on base 31 is not obscured because of this elevation. If display 35 had not been elevated, the user's view of the keyboard would be obscured and perhaps even inaccessible due to the presence of display 35.

The position of display 35 in FIG. 7 may tend to block overhead illumination of the keyboard. This is particularly true in a darkened airplane cabin wherein the light is provided only by overhead reading lights. To overcome this potential problem, computer 21 is provided with a small source of light 59 located near the lower edge of display 35. Light 59 may comprise a redirected portion of the light emitted from the existing backlight behind display 35 or an entirely separate source.

With the former approach, the rear surface of the backlight is at least partially exposed or covered with a transparent or semi-transparent cover in order to provide "free" keyboard illumination. Portions of arms 43 and/or the inside of lid 33 can be made reflective so as to optimize the brightness and uniformity of the keyboard illumination. Note that the backlight illumination and, thus, the reflected keyboard illumination from light leaked out of the backlight, is not a function of whether the images on display 35 are bright or dark. It is only a function of the overall backlight brightness setting. This guarantees that the keyboard is visible even when a substantially dark image is on the screen.

The invention has several advantages. The device allows the display to be articulated for better and proper viewing even in limited or cramped conditions. It may also be used to improve ergonomics in other locations such as a desktop. The device does not cause the display to disturb the user's view of the keyboard. A built-in keyboard light ensures that the keyboard is properly lit even though the display may block some overhead illumination. The latching mechanism employed reduces the size, strength and stiffness required of the support arms. The location of display ends of the support arms near the center of gravity of the display reduces the amount of friction necessary to maintain the display in a given orientation. The same release latch may be used to disengage both arms, making it easier for the user to move the display between positions. With the display in the lower position, the computer can be used exactly like a conventional computer.

While the invention has been shown or described in only some of its forms, it should be apparent to those skilled in the art that it is not so limited, but is susceptible to various changes without departing from the scope of the invention.

We claim:

1. A computer, comprising:
    a base having front and rear edges and a keyboard on an upper surface therebetween;
    a lid having an upper edge, and a lower edge pivotally mounted adjacent to the rear edge of the base, the lid having open and closed positions relative to the base;
    a display monitor associated with the lid for viewing by a user, the display monitor having an upper edge;
    a linkage device mounted to the display monitor at a monitor connection and to the lid; and wherein
    when the lid is in the open position, the linkage device allows movement of the display monitor between a retracted position wherein the display monitor is substantially flush with the lid, and an extended position wherein the display monitor is deployed and articulated away from the lid such that both the upper edge of the display monitor and the monitor connection are located above the upper edge of the lid to improve the user's view of the display monitor.

2. The computer of claim 1 wherein a center of gravity of the display monitor is located above and in front of the lid when the display monitor is in the extended position.

3. The computer of claim 1 wherein the display monitor is pivotally mounted to the linkage device such that the display monitor may be tilted relative to the lid when the display monitor is in the extended position.

4. The computer of claim 1, further comprising detents in the lid for securing the linkage device and the display monitor in each of the retracted and extended positions.

5. The computer of claim 4 further comprising a spring clip mounted in each of the detents for releasably engaging the linkage device.

6. The computer of claim 1 wherein the keyboard is illuminated by light from a backlight of the display monitor.

7. The computer of claim 6 wherein the lid has a front surface that is reflective such that the backlight of the display monitor is reflected off of the front surface of the lid.

8. The computer of claim 1 wherein the display monitor has upper and lower edges that are free of contact with the lid and the linkage device when the display monitor is in the extended position.

9. A portable computer, comprising:
a base having front and rear edges and a keyboard on an upper surface therebetween;
a lid having an upper edge, and a lower edge pivotally mounted adjacent to the rear edge of the base, wherein the lid is movable between open and closed positions relative to the base;
a display monitor associated with the lid for viewing by a user, the display monitor having an upper edge;
a linkage having a pair of arms, each pivotally mounted to a side edge of each of the display monitor and the lid, wherein the arms have a monitor pivot axis and a lid pivot axis; and wherein
when the lid is in the open position, the arms allow movement of the display monitor between a retracted position wherein the display monitor is substantially flush with the lid, and an extended position wherein the display monitor is deployed and moved upward and forward relative to the lid such that each of the upper edge and the monitor pivot axis are located above the upper edge of the lid to improve the user's view of the display monitor.

10. The computer of claim 9 wherein a center of gravity of the display monitor is located above and in front of the lid when the display monitor is in the extended position.

11. The computer of claim 9 wherein the display monitor is rotatable about the monitor pivot axis when the display monitor is in the extended position.

12. The computer of claim 9, further comprising a pair of upper and lower detents in the side edges of the lid, the upper and lower detents being located above and below the lid pivot axis, respectively, for retaining the linkage when the display monitor is in the extended and retracted positions, respectively.

13. The computer of claim 12, further comprising a spring clip mounted in each of the upper and lower detents for releasably engaging the arms of the linkage.

14. The computer of claim 9 wherein the lid has a front surface that is reflective such that the keyboard is illuminated by light from a backlight of the display monitor that is reflected off of the front surface of the lid.

15. The computer of claim 9 wherein the display monitor has upper and lower edges that are free of contact with the lid and the linkage when the display monitor is in the extended position.

16. The computer of claim 9 wherein the monitor pivot axis is located between upper and lower edges of the display monitor, and is substantially vertically aligned with a center of gravity of the display monitor.

17. A portable computer, comprising:
a base having front and rear edges and a keyboard on an upper surface therebetween;
a lid having an upper edge, and a lower edge pivotally mounted adjacent to the rear edge of the base, wherein the lid is movable between open and closed positions relative to the base;
a display monitor associated with the lid for viewing by a user and having an upper edge, a lower edge, a retracted position wherein the display monitor is substantially flush with the lid, and an extended position wherein the display monitor is deployed and moved upward and forward relative to the lid, such that the upper edge of the display monitor is located above the upper edge of the lid, and the upper and lower edges of the display monitor are free of contact with the lid;
a linkage having pair of arms, each pivotally mounted to a side edge of each of the display monitor and the lid, the arms having a monitor pivot axis and a lid pivot axis, wherein the monitor pivot axis is located above the upper edge of the lid when the display monitor is in the extended position;
a pair of upper and lower detents in the side edges of the lid, the upper and lower detents being located above and below the lid pivot axis, respectively, for retaining the linkage when the display monitor is in the extended and retracted positions, respectively; and wherein
when the display monitor is in the extended position, the display monitor is pivotable relative to the lid to improve the user's view of the display monitor.

18. The computer of claim 17, wherein the lid has a front surface that is reflective such that the keyboard is illuminated by light from a backlight of the display monitor that is reflected off of the front surface of the lid.

19. The computer of claim 17 wherein the monitor pivot axis is located between the upper and lower edges of the display monitor, and is substantially vertically aligned with a center of gravity of the display monitor.

* * * * *